(12) United States Patent
Matsumoto et al.

(10) Patent No.: US 11,821,724 B2
(45) Date of Patent: Nov. 21, 2023

(54) DIGITAL MICROMETER

(71) Applicant: MITUTOYO CORPORATION, Kawasaki (JP)

(72) Inventors: Koji Matsumoto, Kure (JP); Yuji Fujikawa, Kure (JP); Shinichiro Yanaka, Kawasaki (JP); Osamu Saito, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 586 days.

(21) Appl. No.: 17/251,097

(22) PCT Filed: Jun. 7, 2019

(86) PCT No.: PCT/JP2019/022690
§ 371 (c)(1),
(2) Date: Dec. 10, 2020

(87) PCT Pub. No.: WO2019/240025
PCT Pub. Date: Dec. 19, 2019

(65) Prior Publication Data
US 2021/0140751 A1    May 13, 2021

(30) Foreign Application Priority Data

Jun. 12, 2018  (JP) ................................ 2018-112122
May 25, 2019  (JP) ................................ 2019-098160

(51) Int. Cl.
*G01B 3/18*   (2006.01)
*G01B 7/14*   (2006.01)

(52) U.S. Cl.
CPC   *G01B 3/18* (2013.01); *G01B 7/14* (2013.01)

(58) Field of Classification Search
CPC ................................... G01B 3/18; G01B 7/14
(Continued)

(56) References Cited

U.S. PATENT DOCUMENTS

| 2,344,595 A | 3/1944 | Calow et al. |
| 3,924,336 A * | 12/1975 | Inoue ...................... G01B 3/18 33/819 |

(Continued)

FOREIGN PATENT DOCUMENTS

| CN | 1110784 | 10/1995 |
| CN | 1407312 | 4/2003 |

(Continued)

OTHER PUBLICATIONS

International Search Report dated Jul. 2, 2019, Application No. PCT/2019/022690, 4 pages.
(Continued)

*Primary Examiner* — George B Bennett
(74) *Attorney, Agent, or Firm* — Rankin, Hill & Clark LLP

(57) ABSTRACT

A digital micrometer includes a main-body frame, a spindle, a thimble part, and a displacement detector that detects displacement of the spindle. The main-body frame includes a U-shaped frame part, and a spindle holding part provided on the other end side of the U-shaped frame part and having a length in a direction away from an anvil. The spindle is held by a spindle holding part, provided to be movable forward and backward in an axial direction with respect to the anvil, and includes a contactor on one end face. The main-body frame and the spindle are formed of a non-magnetic material.

15 Claims, 9 Drawing Sheets

(58) Field of Classification Search
USPC .................................................. 33/813, 819
See application file for complete search history.

(56) References Cited

U.S. PATENT DOCUMENTS

| | | | | |
|---|---|---|---|---|
| 4,437,241 | A * | 3/1984 | Lemelson | G01W 1/00 374/E13.002 |
| 4,550,507 | A | 11/1985 | Nishikata | |
| 4,578,868 | A | 4/1986 | Sasaki et al. | |
| 5,433,016 | A * | 7/1995 | Tachikake | G01B 3/18 33/703 |
| 5,596,813 | A | 1/1997 | Olson, Jr. et al. | |
| 6,192,096 | B1 | 2/2001 | Ichikawa et al. | |
| 6,243,965 | B1 * | 6/2001 | Zanier | G01B 3/18 33/705 |
| 6,553,685 | B2 * | 4/2003 | Nishina | G01B 3/18 33/813 |
| 8,739,428 | B2 * | 6/2014 | Emtman | G01B 3/008 33/831 |
| 8,997,369 | B2 * | 4/2015 | Jones | G01B 3/18 33/813 |
| 9,551,595 | B2 * | 1/2017 | Sasaki | G01D 5/2046 |
| 10,451,450 | B2 * | 10/2019 | Niwano | G01D 7/00 |
| 10,551,217 | B2 * | 2/2020 | Cook | G01D 5/2053 |
| 10,673,174 | B2 * | 6/2020 | Hayashida | G01B 3/205 |
| 11,466,971 | B2 * | 10/2022 | Yamaji | G01B 5/20 |
| 2003/0037455 | A1 | 2/2003 | Terui et al. | |
| 2007/0068027 | A1 | 3/2007 | Suzuki | |
| 2016/0169653 | A1 | 6/2016 | Atherton | |

FOREIGN PATENT DOCUMENTS

| | | |
|---|---|---|
| CN | 1940462 | 4/2007 |
| DE | 3344072 | 6/1984 |
| EP | 1770350 | 4/2007 |
| EP | 3225950 A1 | 10/2017 |
| FR | 2812938 A1 | 2/2002 |
| JP | 50-50053 | 5/1975 |
| JP | 51-82480 | 7/1976 |
| JP | 58-115301 | 7/1983 |
| JP | 59-110953 | 6/1984 |
| JP | 59-187203 | 10/1984 |
| JP | 60-236001 | 11/1985 |
| JP | S60-236001 A | 11/1985 |
| JP | 63-298001 | 12/1988 |
| JP | 7-146101 | 6/1995 |
| JP | H07-146101 A | 6/1995 |
| JP | 2000-121781 | 4/2000 |
| JP | 2003-065701 | 3/2003 |
| JP | 2004-309473 | 11/2004 |
| JP | 2006-170904 A | 6/2006 |
| JP | 2007-093331 | 4/2007 |
| JP | 2008-002820 | 1/2008 |
| JP | 4072282 | 4/2008 |
| JP | 2009-243883 | 10/2009 |
| JP | 3184265 | 6/2013 |

OTHER PUBLICATIONS

Written Opinion of the International Searching Authority dated Jul. 2, 2019 in PCT/JP2019/22690 and its partial English translation, 10 pages.
European Search Report, EP Application No. 19819083, dated Feb. 8, 2022, 10 pages.
Japanese Notice of Reasons for Refusal from corresponding Japanese Patent Application No. 2019-098160, drafted May 30, 2023, 8 pages.
Chinese Office Action corresponding to Application No. CN 201980039557.7, dated Jan. 19, 2023, 18 pages.
Japanese Office Action dated Apr. 11, 2022, JP 2018-112122, with English translation, 8 pages.
Chinese 2nd Office Action dated Feb. 21, 2022, CN 201980039557.7, with English translation, 18 pages.
Chinese Office Action dated Nov. 30, 2021, Application No. 201980039557.7; English translation included, 18 pages.

* cited by examiner

DIGITAL MICROMETER

TECHNICAL FIELD

The present invention relates to a digital micrometer.

BACKGROUND ART

Recently, demand for hybrid vehicles and electric vehicles has been increased, and permanent-magnet synchronous motors are intensively developed and manufactured. Strong magnets are indispensable to high-performance permanent-magnet synchronous motors. Thus, the machining accuracy of magnets to be incorporated in the permanent-magnet synchronous motors matters.

Generally, small measuring devices, such as micrometers or calipers, are convenient and suitable for measuring the machining accuracy of a small part, but main parts of a small measuring device, such as a frame and the like, are iron (cast iron) products. Thus, when an object to be measured that is a strong magnet is brought close to a small measuring device, those two are strongly stuck to each other. Then, measurement cannot be performed, and it is difficult to separate them. For this reason, if a small part is a strong magnet, it has been required to use a large measuring machine, such as a coordinate measuring machine or the like, to measure the small part. This considerably affects manufacturing efficiency and cost.

There have been proposed various small measuring devices suitable for being used in a magnetic field. However, there has been no digital type device that can be durable in practical use.

CITATION LIST

Patent Literature

Patent Literature 1: Japanese Unexamined Utility Model Application Publication No. S51-82480
Patent Literature 2: Japanese Unexamined Patent Application Publication No. S60-236001
Patent Literature 3: Japanese Unexamined Utility Model Application Publication No. S50-50053
Patent Literature 4: Japanese Unexamined Patent Application Publication No. 2009-243883
Patent Literature 5: Japanese Patent No. 4072282
Patent Literature 6: Japanese Registered Utility Model No. 3184265
Patent Literature 7: Japanese Unexamined Patent Application Publication No. S58-115301

SUMMARY OF INVENTION

Technical Problem

In order for a small measuring device to be suitable for being used in a magnetic field, the constituent parts of the small measuring device can be formed of a non-magnetic material. However, a non-magnetic material having strength is a difficult-to-cut material. For example, in a micrometer, it is required to form an external thread on the spindle and to tap an internal thread on the main-body frame with high accuracy, but it is difficult to perform such machining on a non-magnetic material. For this reason, it is desired that a practically accurate digital micrometer capable of measuring an object to be measured that is a strong magnet.

A purpose of the present invention is to provide a digital micrometer suitable for measuring an object to be measured that is a strong magnet.

Solution to Problem

A digital micrometer according to the present invention includes:
  a main-body frame including an U-shaped frame part including an anvil provided on an inner side of one end of the U-shaped frame, and a spindle holding part provided on the other end side of the U-shaped frame part and having a length in a direction away from the anvil;
  a spindle held by the spindle holding part, provided to be movable forward and backward in an axial direction with respect to the anvil, and including a contactor on one end face;
  a thimble part that converts rotational operation into linear motion of the spindle; and
  a displacement detector that detects displacement of the spindle, in which
  the main-body frame and the spindle are formed of a non-magnetic material,
  the thimble part and the displacement detector are disposed on the other end side of the spindle holding part, and
  the length of the spindle holding part is a predetermined value or more.

In an embodiment of the present invention, it is preferable that
  the length of the spindle holding part is a measuring range d or more,
  where the measuring range d is a distance between the anvil and the contactor when the spindle is most separated from the anvil.

In an embodiment of the present invention, it is preferable that the length of the spindle holding part is 200 mm or more.

In an embodiment of the present invention, it is preferable that
  the thimble part includes:
    an inner sleeve having a slit along an axial line and fixedly provided on the other end side of the main-body frame; and
    an outer sleeve fitted on the inner sleeve to be rotatable in a peripheral direction and having a spiral groove on an inner peripheral surface,
  the spindle includes an engaging pin,
  the engaging pin is fixedly provided to the spindle and engaged with the spiral groove through the slit, and
  the thimble part is provided on the other end of the spindle holding part.

In an embodiment of the present invention, it is preferable that the displacement detector is provided on the other end of the thimble part.

In an embodiment of the present invention, it is preferable that
  the displacement detector includes:
    a contactor inserted inside the thimble part from the other end of the thimble part to move integrally with the other end of the spindle; and
    an encoder including a scale that moves integrally with the contactor, and a detection head that detects a relative position or a relative displacement amount with respect to the scale.

In an embodiment of the present invention, the digital micrometer preferably includes a first protection member formed of a non-magnetic material and disposed, around the thimble part, at a position separated from the thimble part by a predetermined distance.

In an embodiment of the present invention, the digital micrometer preferably includes a second protection member formed of a non-magnetic material and disposed, around the displacement detector, at a position separated from the displacement detector by a predetermined distance.

A digital micrometer according to the present invention includes:
- a main-body frame having a U shape and including an anvil provided on an inner side of one end of the U shape;
- a spindle provided on the other end side of the main-body frame to be movable forward and backward in an axial direction with respect to the anvil and including a contactor on one end face;
- a thimble part that is provided on the other end side of the main-body frame, receives the other end of the spindle, and converts rotation operation into linear motion of the spindle; and
- an encoder including a main scale that moves integrally with the spindle, and a detection head that is disposed on the main-body frame and detects a relative position or a relative displacement amount with respect to the main scale, in which the main-body frame and the spindle are formed of a non-magnetic material,
the thimble part includes:
- an inner sleeve having a slit along an axial line and fixedly provided on the other end side of the main-body frame; and
- an outer sleeve fitted on the inner sleeve to be rotatable in a peripheral direction and having a spiral groove on an inner peripheral surface, the spindle includes an engaging pin, and
the engaging pin is fixedly provided to the spindle and engaged with the spiral groove through the slit.

In an embodiment of the present invention, it is preferable that
the main-body frame is formed of austenitic stainless steel, pure aluminium, or a non-magnetic aluminium alloy, and
the spindle is formed of austenitic stainless steel.

In an embodiment of the present invention, it is preferable that the anvil and the contactor is formed of ceramic.

In an embodiment of the present invention, the digital micrometer preferably includes a guide bush provided, on the other end side of the main-body frame, closer to the anvil to bear the spindle, in which
the guide bush is formed of brass.

In an embodiment of the present invention, it is preferable that the inner sleeve is formed of brass, pure aluminium, a non-magnetic aluminium alloy, or austenitic stainless steel.

In an embodiment of the present invention, it is preferable that the encoder is a capacitive encoder, a photoelectric encoder, an electromagnetic induction encoder, or a magnetic encoder.

In an embodiment of the present invention, it is preferable that
the main-body frame is formed of austenitic stainless steel,
the spindle is formed of austenitic stainless steel,
the inner sleeve is formed of brass, and
the encoder is a capacitive encoder.

DESCRIPTION OF EMBODIMENTS

Figure 1:
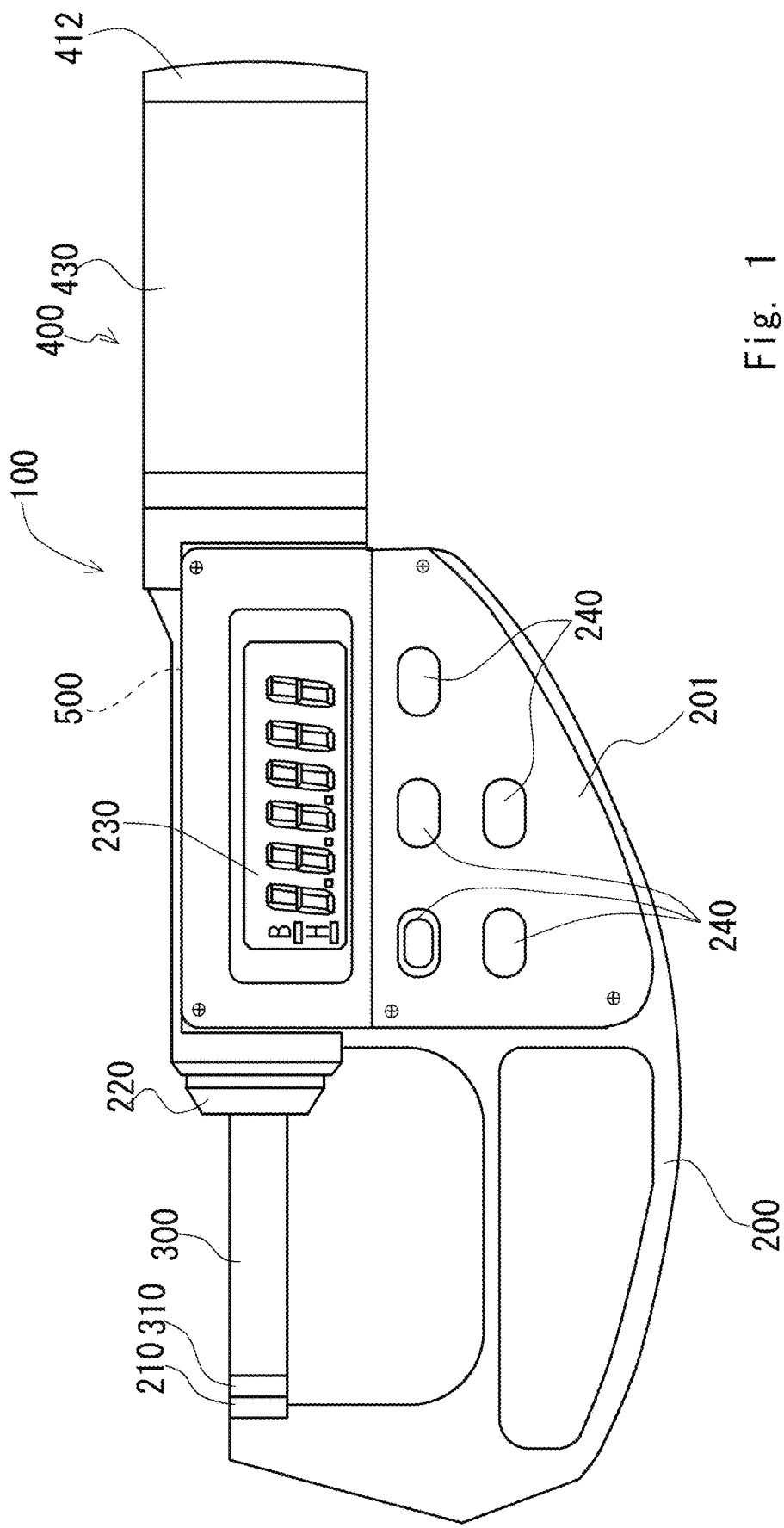
FIG. 1 is a front view of the external appearance of a digital micrometer.

Embodiments of the present invention are illustrated and described with reference to reference signs attached to elements in the drawings.

First Exemplary Embodiment

A digital micrometer 100 according to a first exemplary embodiment of the present invention is described below.

FIG. 1 is a front view of the external appearance of the digital micrometer 100.

Figure 2:
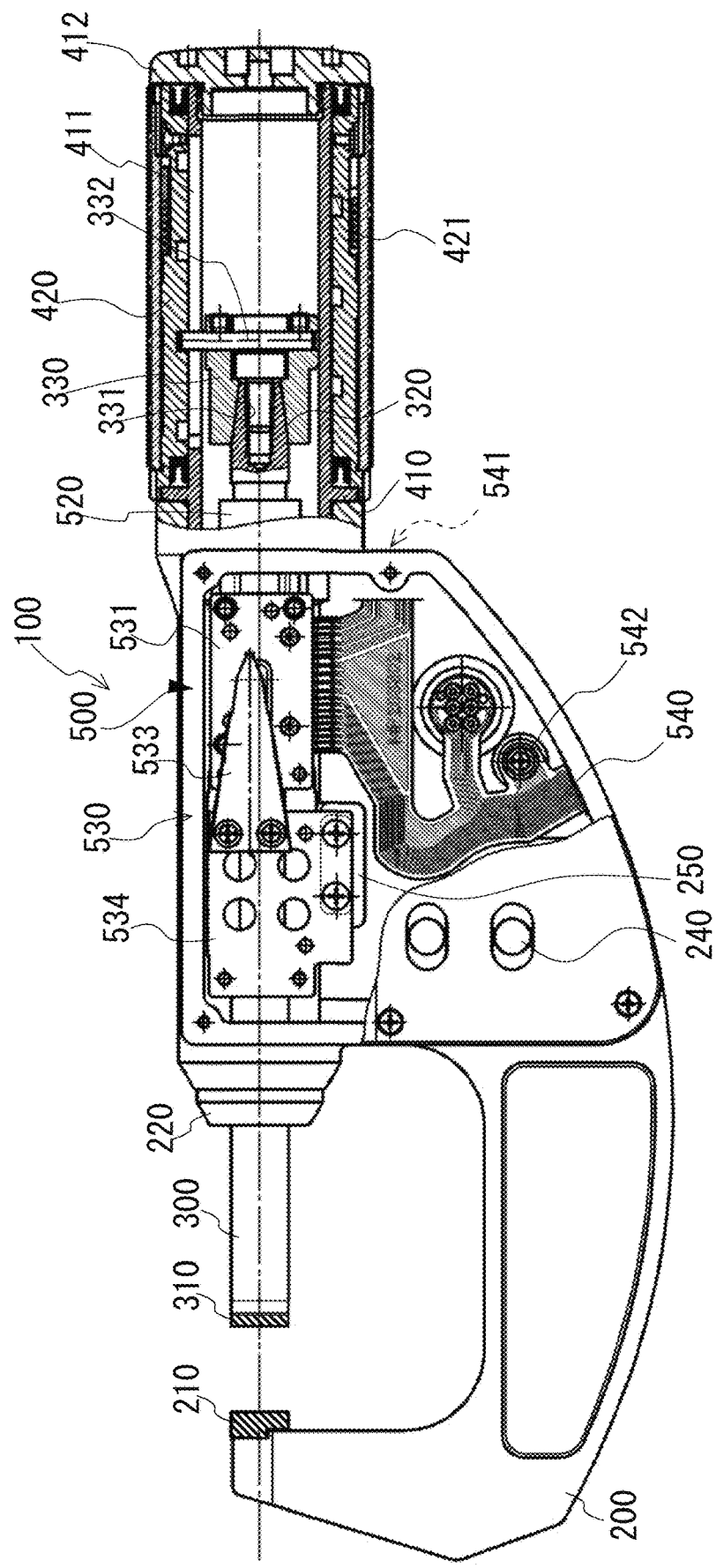
FIG. 2 is a partial cross-sectional view of the internal structure of the digital micrometer.

FIG. 2 is a cross-sectional view of the internal structure of the digital micrometer 100.

The digital micrometer 100 includes a main-body frame 200, a spindle 300, a thimble part 400, and a detecting unit 500.

The main-body frame 200 has a U shape as a whole, and an anvil 210 is provided on the inner side of one end of the U shape.

The spindle 300 is provided on the other end side of the main-body frame 200 to be movable forward and backward.

At this time, on the other end side of the main-body frame 200, a guide bush 220 is mounted closer to the anvil 210, and the thimble part 400 is mounted farther from the anvil 210.

In addition, on the front side of the main-body frame 200, a display panel 201 is disposed. The display panel 201 is provided with a digital display unit 230 and a plurality of operation switches 240. The display panel 201 is formed of a non-magnetic material, such as plastic, resin, or the like.

Here, the main-body frame 200 is preferably formed of austenitic stainless steel. Austenitic stainless steel has strength and a non-magnetic material.

Alternatively, the main-body frame 200 may be formed of pure aluminium or a non-magnetic aluminium alloy.

In addition, the anvil 210 is preferably formed of ceramic. As the composition of ceramic, zirconia is exemplified.

The guide bush 220 is preferably formed of brass. Brass is a non-magnetic and free-cutting material Note that, the guide bush 220 may be formed of austenitic stainless steel.

However, it is preferable to have the difference in hardness in consideration of the relationship between a sliding shaft and a hole, In the case of a micrometer, it is preferable to design the hardness of the spindle to be high and the hardness of the guide bush to be low in such a manner that the guide bush wears when enduring.

Austenitic stainless steel cannot be quenched.

This is because that quenching causes slight magnetism or softening. Thus, difference in the hardness of austenitic stainless steel cannot be controlled by quenching. For this reason, different materials have to be selected for the spindle and the guide bush, and the guide bush 220 is preferably formed of brass if the spindle 300 is formed of austenitic stainless steel.

The spindle 300 is substantially a long rodlike columnar body and is manufactured to be straight. The spindle 300 has one end face provided with an contactor 310. In measurement of an object to be measured, the spindle 300 is moved forward and backward to sandwich the object to be measured between the contactor 310 and the anvil 210. The middle portion of the spindle 300 is borne by the guide bush 220, and the other end side of the spindle 300 is inserted into the thimble part 400.

The other end of the spindle 300 is coupled to an engaging piece member 330. The piece member is an annular member and is fixedly fitted on the other end of the spindle 300. Specifically, the other end of the spindle 300 is provided with a taper 320 whose diameter is gradually reduced, and the engaging piece member 330 is provided with a taper hole 331 for receiving the other end of the spindle 300. An engaging pin 332 is provided by being press-fitted into the engaging piece member 330 in such a manner that the engaging pin 332 projects in the direction perpendicular to the axial direction of the spindle 300.

In the present embodiment, no external thread is formed on the spindle 300, and the spindle 300 itself does not rotate. The spindle 300 moves forward and backward in the axial direction in a non-rotating state.

The spindle 300 is preferably formed of austenitic stainless steel.

In addition, the contactor 310 is preferably a thin chip formed of ceramic similarly to the anvil 210.

The engaging piece member is preferably formed of brass.

Figure 3:
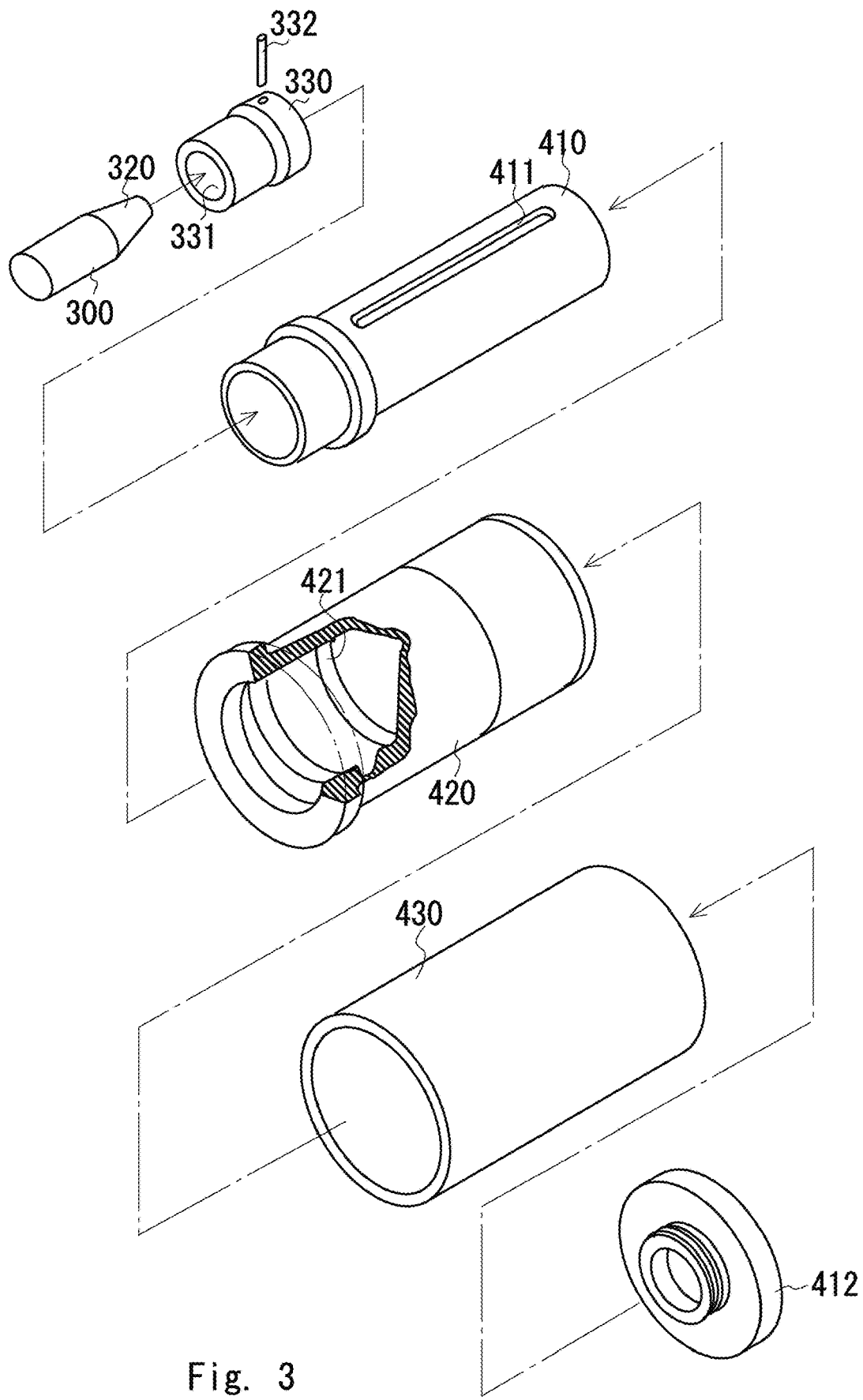
FIG. 3 is an exploded perspective view of a thimble part.

FIG. 3 is an exploded perspective view of the thimble part 400.

The thimble part 400 is provided on the other end side of the main-body frame 200 and is a cylindrical unit as a whole. The thimble part 400 receives the other end side of the spindle 300 inside it. A user moves the spindle 300 forward and backward by rotationally operating the thimble part 400. The thimble part 400 includes an inner sleeve 410, an outer sleeve 420, and a cover member 430.

The inner sleeve 410 is a cylindrical member having openings on both ends and includes one slit 411 along the axial line. One end side of the inner sleeve 410 is fixedly mounted on the other end side of the main-body frame 200. The other end of the spindle 300 is inserted from the opening on the one end side of the inner sleeve 410. At this time, the other end of the spindle 300 is inserted into the inner sleeve 410, and the engaging pin 332 is press-fitted into the engaging piece member 330 through the slit 411 in such a manner that the engaging pin 332 protrudes from the slit 411. The inner diameter of the inner sleeve 410 is designed to be the same as the outer diameter of the engaging piece member 330. While the engaging piece member 330 is borne by the inner peripheral surface of the inner sleeve 410, the engaging piece member 330 together with the spindle 300 slides inside the inner sleeve 410. At this time, since the engaging pin 332 protrudes from the slit 411, the spindle 300 moves forward and backward while the rotation thereof is stopped by the engaging pin 332.

Into the opening on the other end side of the inner sleeve 410, a cap 412 is screwed.

The outer sleeve 420 is a cylindrical member having openings on both ends and is provided by being fitted on the outer surface of the inner sleeve 410.

At this time, the outer sleeve 420 is rotatable in the peripheral direction with respect to the inner sleeve 410. Here, on the inner peripheral surface of the outer sleeve 420, one spiral groove 421 is formed. The engaging pin 332 is engaged with the spiral groove 421.

The cover member 430 is a cover covering the outer surface of the outer sleeve 420 and has a knurled surface. There is no slippage between the cover member 430 and the outer sleeve 420, and the cover member 430 and the outer sleeve 420 integrally rotate.

When the cover member 430 is rotationally operated in the peripheral direction, the cover member 430 and the outer sleeve 420 rotate in the peripheral direction. Here, the engaging pin 332 is engaged with the spiral groove 421 on the inner peripheral surface of the outer sleeve 420, and the rotation of the engaging pin 332 is regulated by the slit 411 of the inner sleeve 410. Thus, by rotationally operating the cover member 430, the engaging pin 332 is pushed by the spiral groove 421 and moves forward and backward.

Since the engaging pin 332, the engaging piece member 330, and the spindle 300 are integrated, the spindle 300 also moves forward and backward when the engaging pin 332 moves forward and backward.

Since the spindle 300 is formed of austenitic stainless steel, it is difficult to form a thread on the spindle itself as a mechanism for moving the spindle 300 forward and backward. In this regard, the engaging pin 332 whose rotation is regulated is moved by the spiral groove 421 of the outer sleeve 420 in the present embodiment.

Here, the inner sleeve 410 is preferably formed of brass.

Brass is a non-magnetic and free-cutting material.

Since the inner sleeve 410 is a bearing member, the machining accuracy of its inner diameter is required. In addition, the inner sleeve 410 is formed with the slit 411, and the slit 411 secures the straight movement of the spindle 300 and stops the rotation. As described later, in order for an encoder 510 to detect the movement of the spindle 300, a main scale 511 is directly or indirectly mounted on the spindle in the present embodiment.

Thus, if the spindle 300 slightly rotates, the detection accuracy of the encoder is affected. In this respect, since it is difficult to machine austenitic stainless steel, brass is considered to be preferable as a material of the inner sleeve 410.

Alternatively, the inner sleeve 410 may be formed of pure aluminium or a non-magnetic aluminium alloy. In the case of pure aluminium or an aluminium alloy, it has some disadvantages in large thermal expansion (a large linear expansion coefficient) and stiffness (Young's modulus) but has advantages in easily machining and light weight. If the main-body frame 200 is formed of austenitic stainless steel, the inner sleeve 410 may be formed of pure aluminium or an aluminium alloy, considering the total weight balance.

It is desirable that a small measuring device (small tool) has a weight that is not burden when held with one hand for a long time. Such a device hardly damages itself and is safe when dropped.

On the other hand, if the main-body frame 200 is formed of pure aluminium or a non-magnetic aluminium alloy, the inner sleeve 410 is preferably formed of brass.

In addition, the inner sleeve 410 may be formed of austenitic stainless steel.

Austenitic stainless steel is preferable as a material of a measuring device among non-magnetic materials since it has small thermal expansion and high strength. However, it has problems of difficulty in machining and of increasing the weight.

In addition, the outer sleeve is a resin molded product (for example, a liquid crystal polymer). The cover member is preferably formed by a resin molded product.

Next, the configuration of the detecting unit 500 is described.

Figure 4:
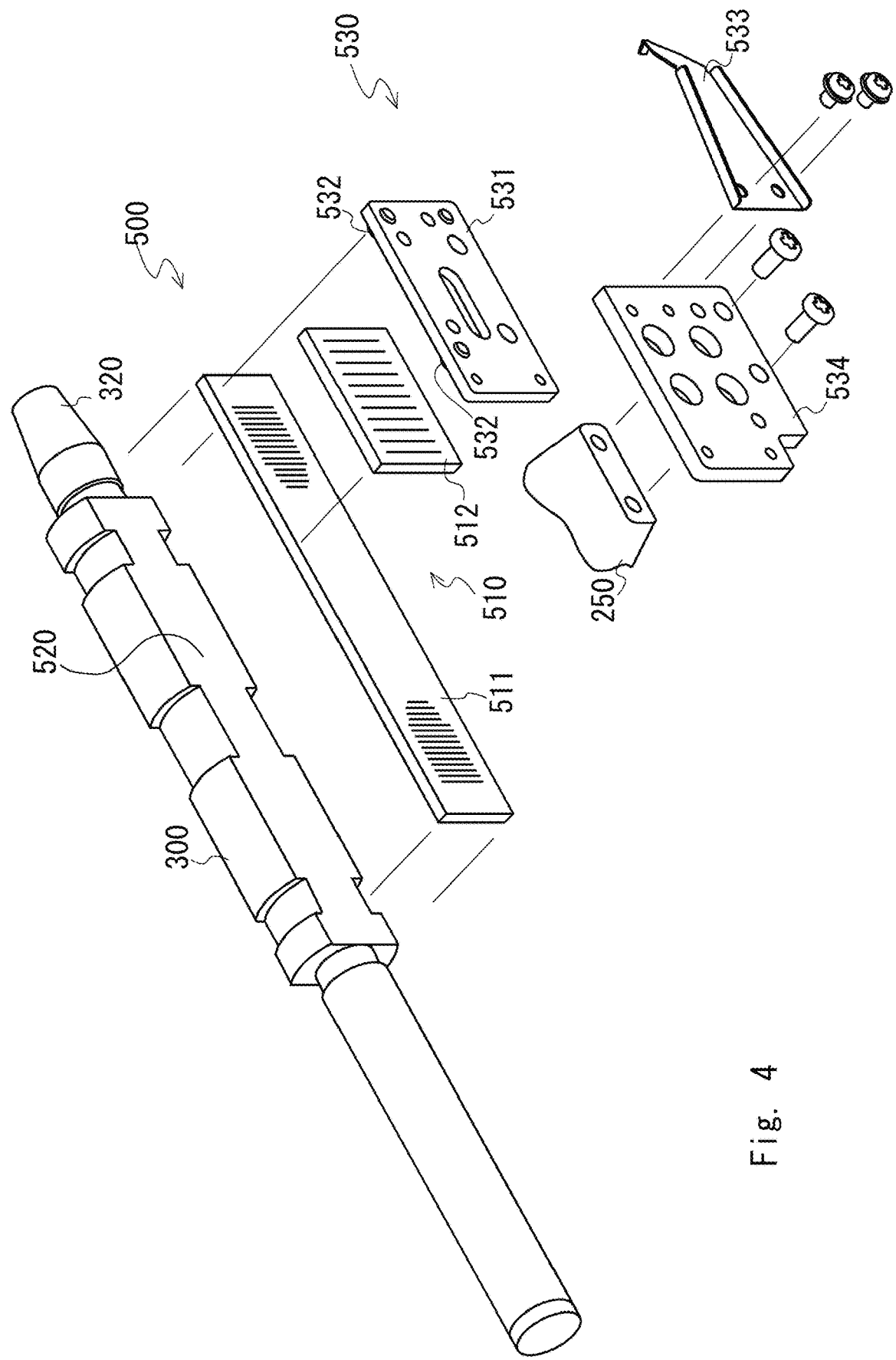
FIG. 4 is an exploded perspective view of a detecting unit.

FIG. 4 is an exploded perspective view of the detecting unit 500.

The detecting unit 500 includes an encoder 510 and a head fixing part 530.

The encoder 510 is a linear encoder 510 and includes an elongate main scale 511 and a detection head 512.

The main scale 511 and the detection head 512 are relatively movable along the longitudinal direction of the main scale 511, and the detection head 512 detects the position or displacement with respect to the main scale 511. In the present embodiment, the detection head 512 is fixedly provided to the main-body frame 200, and the main scale 511 moves forward and backward together with the spindle 300.

In this description, the linear encoder 510 is a capacitive type. That is, the main scale 511 is formed by arranging grid electrodes in the longitudinal direction at a predetermined pitch on a glass substrate. The detection head 512 is formed by providing a plurality of sets of transmitting electrodes and receiving electrodes on a glass substrate. Then, a predetermined AC signal is transmitted from the transmitting electrodes of the detection head 512 to the grid electrodes of the main scale 511, and the receiving electrodes read the potential of the grid electrodes induced by the AC signal. Consequently, the detection head 512 detects the position or displacement with respect to the main scale 511.

The spindle 300 has a side face having a plane surface, and the plane surface serves as a scale base 520. The main scale 511 is fixedly mounted on the scale base 520. Consequently, the main scale 511 moves forward and backward together with the spindle 300.

The head fixing part 530 includes a head holding plate 531, a pressing plate 533, and a fixing plate 534.

The head holding plate 531 has a face (rear face) provided with the detection head 512.

On the face of the head holding plate 531, a plurality of (three) protrusions 532 is formed at a position where the protrusions 532 do not interfere with the detection head 512, and the tips of the protrusions 532 slidably abut the main scale 511. Consequently, the detection head 512 faces the main scale 511 while keeping a position with a predetermined gap.

The pressing plate 533 is a flat spring that presses the other face (front face) of the head holding plate 531 to press the head holding plate 531 against the main scale 511. The pressing plate 533 is a cantilever flat spring that presses the head holding plate 531 from the front face.

The fixing plate 534 holds the pressing plate 533 in a cantilever manner. In addition, the fixing plate 534 is screwed to a mounting base 250 formed on the main-body frame 200.

For example, the head fixing part 530, the head holding plate 531, the pressing plate 533, and the fixing plate 534 are formed of austenitic stainless steel.

Inside the main-body frame 200, a flexible printed circuit board 540 is provided. The flexible printed circuit board 540 includes the wiring of the encoder 510 (the main scale 511 and the detection head 512), an external output terminal 541, a GND terminal 542, an arithmetic processing circuit, the digital display unit 230, and the operation switches 240, that is, incorporates what is called an electrical system.

In the present embodiment, as the movement mechanism of the spindle 300, the configuration for moving the engaging pin 332 by the rotation of the spiral groove 421 is employed. However, with this configuration, the accuracy of the spiral groove 421 is limited, and it is difficult to accurately acquire the displacement amount of the spindle 300 from the rotation amount of the thimble part 400. In this regard, the configuration for detecting the displacement of the spindle 300 with the encoder 510 is employed in the present embodiment.

Second Exemplary Embodiment

A second exemplary embodiment of the present invention is described below with reference to FIGS. 5 to 8.

The basic configuration in the second exemplary embodiment is common to that in the first exemplary embodiment, but the second exemplary embodiment has a characteristic that a spindle holding part 720 provided between a U-shaped frame part 710 and a thimble part 400 has a length of a predetermined value or more.

The elements common to the second exemplary embodiment and the first exemplary embodiment are denoted by the same reference signs, and the description thereof is omitted.

Figure 5:
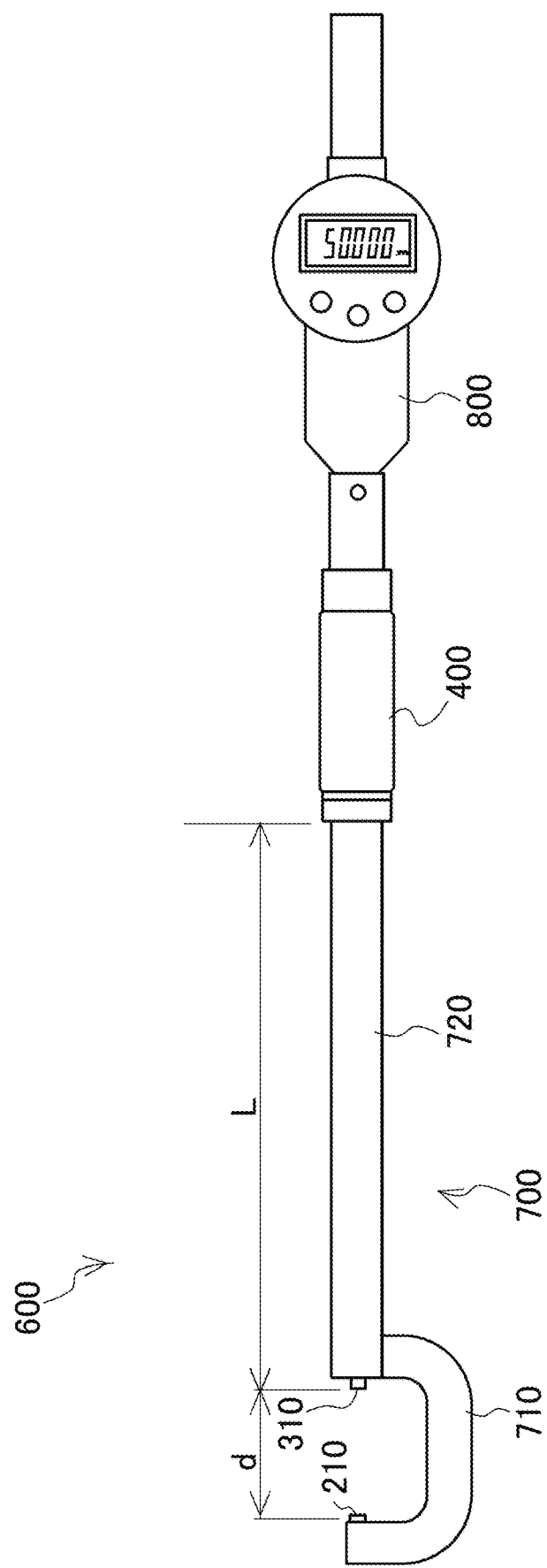
FIG. 5 is an external view of a digital micrometer according to a second exemplary embodiment.

FIG. 5 is an external view of a digital micrometer 600 according to the second exemplary embodiment.

In FIG. 5, a main-body frame 700 includes a U-shaped frame part 710 and a spindle holding part 720.

On an inner side of one end of the U-shaped frame part 710, an anvil 210 is provided. On the other end side of the U-shaped frame part 710, a cylindrical spindle holding part 720 is provided. Then, the U-shaped frame part 710 and the spindle holding part 720 constituting the main-body frame 700 are formed of a non-magnetic material. The non-magnetic material of the main-body frame 700 is, for example, austenitic stainless steel, pure aluminium, or a non-magnetic aluminium alloy.

Figure 6:
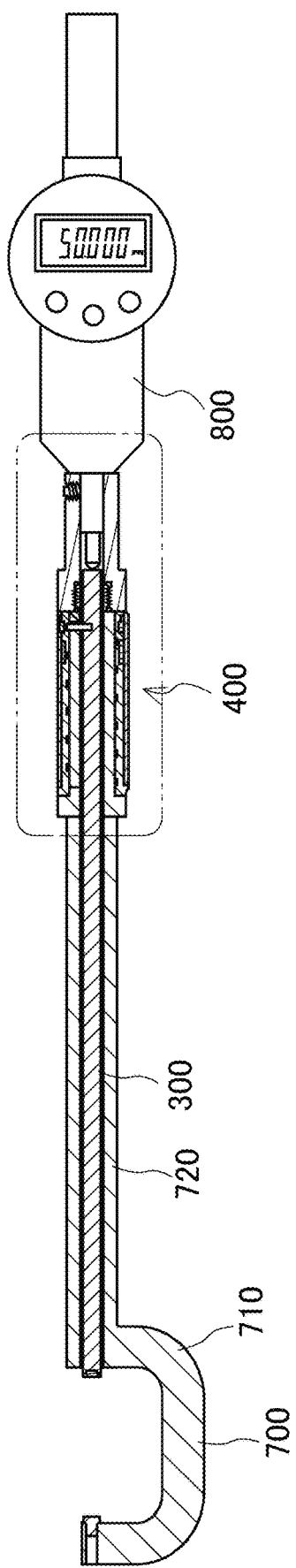
FIG. 6 is a cross-sectional view of the digital micrometer according to the second exemplary embodiment.

FIG. 6 is a cross-sectional view of the digital micrometer 600 according to the second exemplary embodiment.

Inside the cylindrical spindle holding part 720, a spindle 300 is inserted. The spindle 300 protrudes from one end of the spindle holding part 720 and is movable forward and backward in the axial direction with respect to the anvil 210. The spindle 300 has one end face provided with a contactor 310.

Here, the spindle holding part 720 desirably has a simple cylindrical shape. The main-body frame 700 in the second exemplary embodiment does not need a space for incorporating an electrical system unlike the main-body frame 700 in the first exemplary embodiment.

In addition, the length of the spindle holding part 720 is a characteristic of the second exemplary embodiment, but this is described later.

The thimble part 400 is mounted on the other end of the spindle holding part 720. Furthermore, a displacement detector 800 is mounted on the other end of the thimble part 400.

Figure 7:
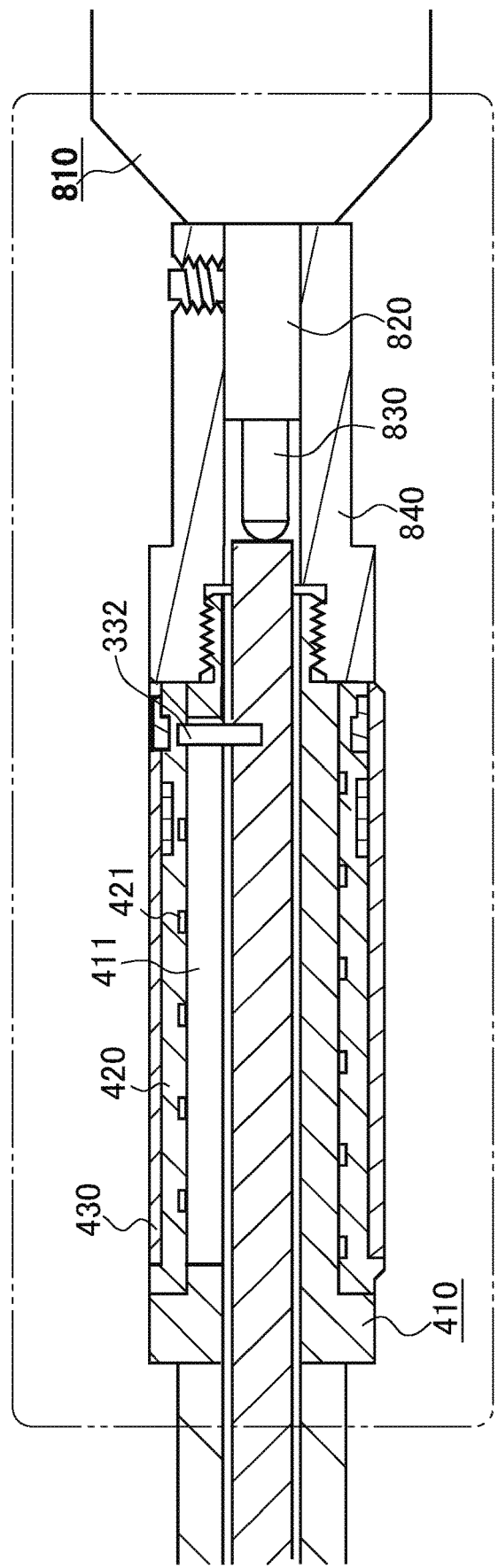
FIG. 7 is a cross-sectional view of a thimble part 400 according to the second exemplary embodiment.

FIG. 7 is a cross-sectional view of the thimble part 400 in the second exemplary embodiment.

Basically, the configuration of the thimble part 400 may be the same as that of the thimble part 400 described in the first exemplary embodiment. However, the constituent material of the thimble part 400 in the second exemplary embodiment is not necessarily a non-magnetic material. For example, the inner sleeve may be formed of an iron (iron and steel) material.

In FIG. 7, an engaging pin 332 is directly mounted to the spindle 300. However, an engaging piece member 330 may be mounted on the rear end of the spindle 300, and the engaging pin 332 may be mounted to the engaging piece member 330 similarly to the first exemplary embodiment.

The displacement detector 800 is only required to digitally detect the amount of forward/backward movement of a rodlike contact point 830. The displacement detector 800 is a length-measuring device (measuring device) that is called a digital dial gauge or an indicator. The displacement detector 800 includes a casing 810, a stem 820 mounted on a side face of the casing 810, the contact point 830 provided through the stem 820 to be movable in the axial direction, and an encoder that detects the displacement of the contact point 830. The displacement detector 800 further includes an arithmetic processing unit, a display function unit, and a connector terminal or wireless communication device for external communication.

To the other end of the thimble part 400, a cylindrical joint 840 is mounted (screwed), and the stem 820 of the displacement detector 800 is fixed on the other end of the cylindrical joint 840. The contact point 830 abuts the rear end of a spindle 210 and follows the forward/backward movement of the spindle 210. Thus, the displacement (position) of the spindle 210 is detected as the displacement (position) of the contact point 830. The constituent material of the displacement detector 800 may be a non-magnetic material or a magnetic material. For example, the contact point 830 may be formed of iron (an iron and steel material).

At a measurement operation time for measuring an object to be measured, the object to be measured is sandwiched between one end and the other end of the U-shaped frame part 710. If the object to be measured is a strong magnet, the magnetic field is strongest in the area between the one end and the other end of the U-shaped frame part 710. If there is a magnetic material near the U-shaped frame part 710 at a measurement operation time, the magnetic material strongly attracts the object to be measured (strong magnet) at the measurement operation time.

The area between the one end and the other end of the U-shaped frame part 710 is referred to as an object-to-be-measured placement area.

In the second exemplary embodiment, the thimble part 400 and the displacement detector 800, which can include a ferromagnetic material (iron and steel material) as the constituent material, are to be separated from the object-to-be-measured placement area by a predetermined distance or more.

The parts that are disposed within the predetermined distance from the object-to-be-measured placement area, such as the main-body frame 700 constituted by the U-shaped frame part 710 and the spindle holding part 720, the spindle 300, and the anvil 210, need to be formed of a non-magnetic material.

On the other hand, as the constituent material of the thimble part 400 and the displacement detector 800 that are disposed to be separated from the object-to-be-measured placement area by the predetermined distance or more, a ferromagnetic material (iron and steel material) is usable.

The inventors has changed the structure of the micrometer as in the second exemplary embodiment and diligently studied about the necessary length L of the spindle holding part 720.

(Here, the length L of the spindle holding part 720 is equivalent to the distance between the object-to-be-measured placement area and the thimble part 400 or the distance between the object-to-be-measured placement area and the displacement detector 800.)

Figure 8:
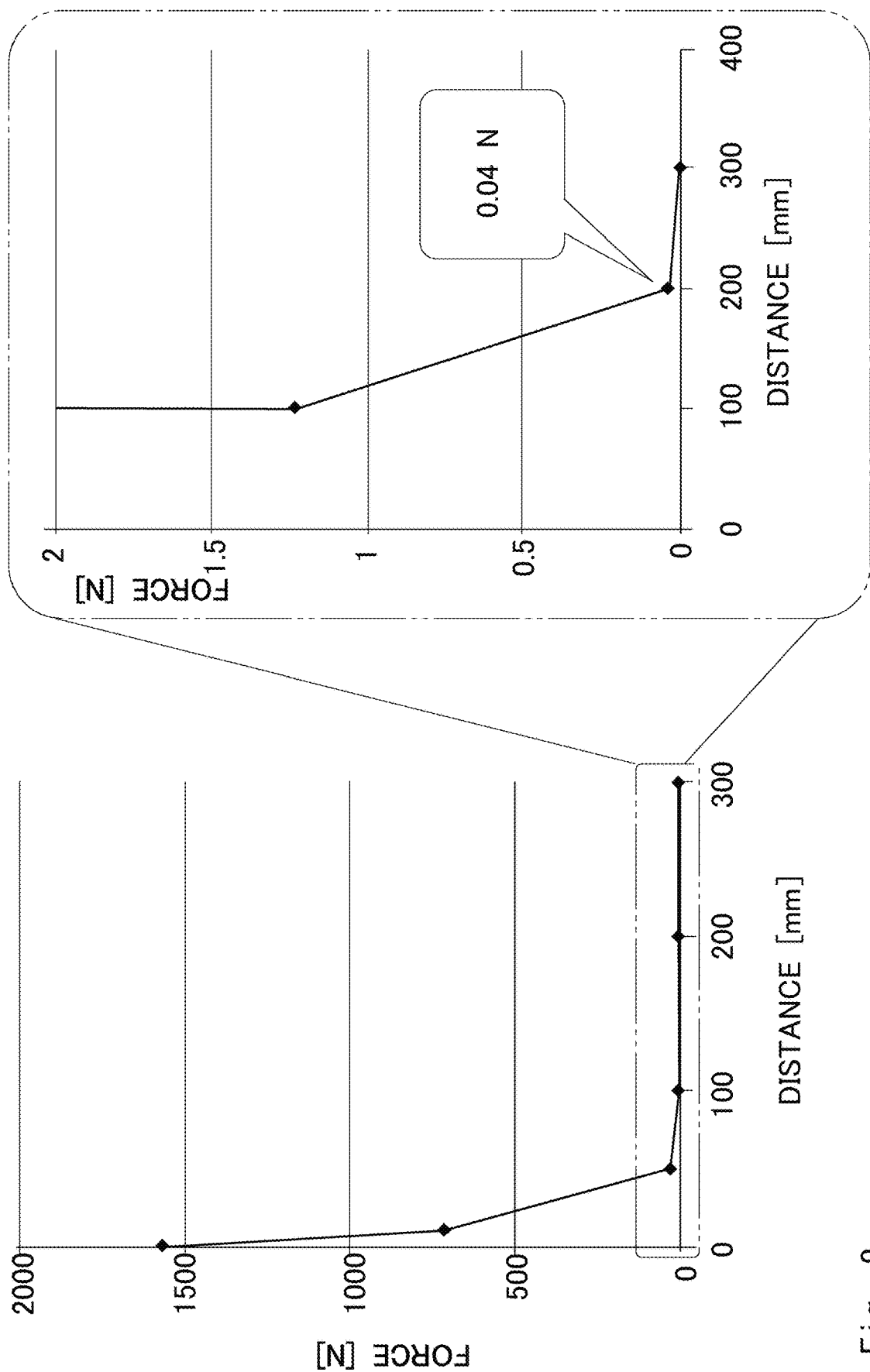
FIG. 8 is a graph in which the force acting between a neodymium magnet having a mass of about 1 kg and a plate having a sufficiently large area and made of iron, which is a ferromagnetic material, is plotted, changing the distance between the magnet and the iron plate.

FIG. 8 is a graph in which the force acting between a neodymium magnet having a mass of about 1 kg and a plate having a sufficiently large area and made of iron, which is a ferromagnetic material, (hereinafter, referred to as an iron plate) is plotted, changing the distance between the magnet and the iron plate.

Since the mass of a magnet used for the motor of a typical hybrid electric vehicle (HEV) or electric vehicle is about 1 kg, the force is calculated on the assumption that the mass of the magnet is about 1 kg in this description.

FIG. 8 shows that the force with which the magnet attracts the iron plate is 0.04 N when the iron plate is separated from the magnet by 200 mm, and that the iron plate is hardly affected by the magnet. For this reason, the length L of the spindle holding part 720 is desirable to be set to 200 mm or more in the second exemplary embodiment.

(In other words, the distance between the object-to-be-measured placement area and the thimble part is set to be 200 mm or more, or the distance between the object-to-be-measured placement area and the displacement detector is set to be 200 mm or more.)

Consequently, in the case of measuring a strong magnet constituting the motor or an HEV, the micrometer in the present embodiment hardly attracts an object to be measured (strong magnet), and it is possible to perform the measurement with high accuracy.

Note that, this does not mean that an object to be measured is always a strong magnet of 1 kg. However, as the size of an object to be measured decreases, the magnetic force of the object to be measured also decreases, and the length L of the spindle holding part 720 may be determined depending on the size of a scheduled object to be measured.

Here, the distance between the anvil 210 and the contactor 310 when the spindle 300 is most separated from the anvil 210 is referred to as a measuring range d of the digital micrometer.

At this time, the length L of the spindle holding part 720 is preferably d or more.

In addition, the length L of the spindle holding part 720 is preferably 1.5 times or more the measuring range d.

Furthermore, the length L of the spindle holding part 720 may be twice or more the measuring range d.

Moreover, the length L of the spindle holding part 720 may be three times or more the measuring range d.

If the length L of the spindle holding part 720 is shorter than the measuring range d, an object to be measured and the thimble part 400 or an object to be measured and the displacement detector 800 can attract each other during the measurement operation, which can affect the measurement accuracy.

If the length L of the spindle holding part 720 is 1.5 times or twice or more the measuring range d, the force with which an object to be measured and the thimble part 400 or an object to be measured and the displacement detector 800 attract each other during the measurement operation will be sufficiently small.

Furthermore, if the length L of the spindle holding part 720 is three times or more the measuring range d, the number of accidents that an object to be measured is brought close to the thimble part 400 or the displacement detector 800 will be considerably reduced in the case of changing the object to be measured.

Note that, if the length of the spindle holding part 720 is longer, the expansion/contraction amount of the spindle holding part 720 due to a temperature change can be increased.

When the spindle holding part 720 expands or contracts during a measurement operation, the expansion/contraction amounts are accumulated as measurement value errors. Thus, it is preferable to reduce measurement value errors by covering the spindle holding part 720 with rubber or synthetic resin although the micrometer in the present embodiment is used by a user holding it with a hand.

Third Exemplary Embodiment

Figure 9:
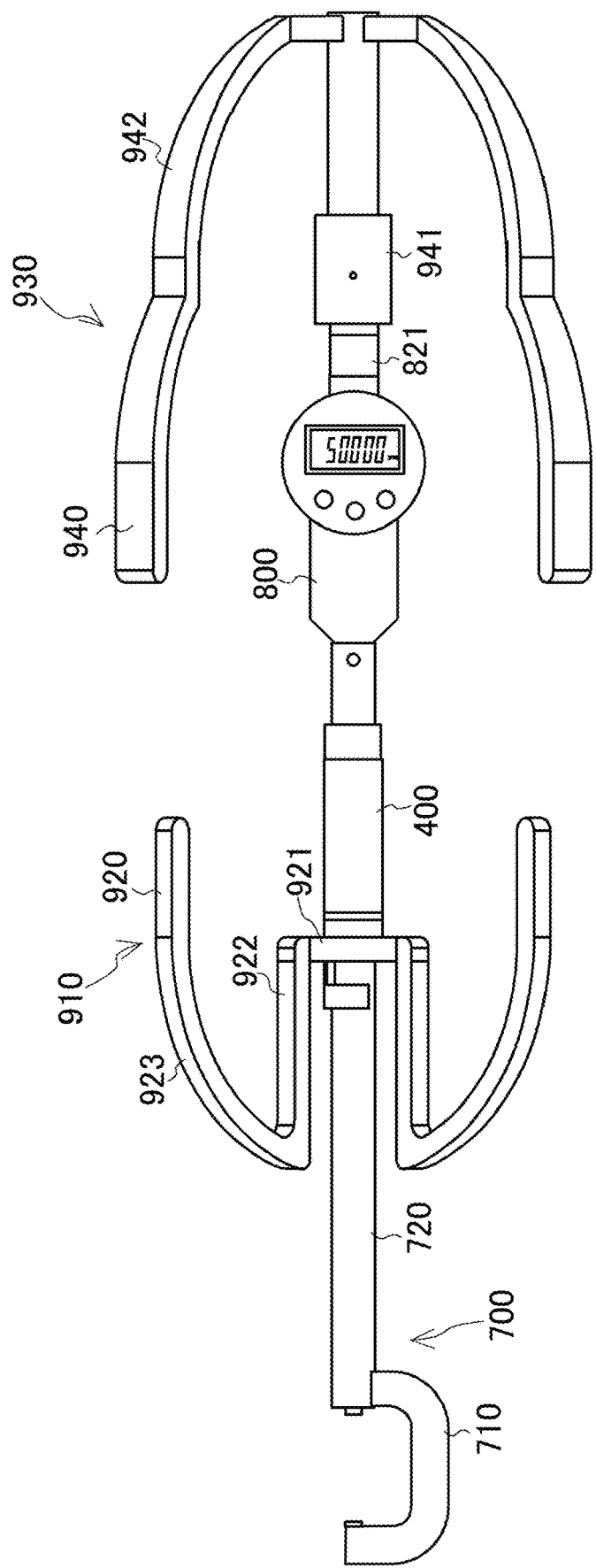
FIG. 9 is a diagram showing an example of a third exemplary embodiment.

FIG. 9 shows an example of a third exemplary embodiment of the present invention.

In the third exemplary embodiment, a protection member is further added to the digital micrometer described in the second exemplary embodiment.

As the protection member, a front protection member (first protection member) 910 and a rear protection member (second protection member) 930 are provided.

The front protection member (first protection member) 910 is disposed around a thimble part 400 and prevents an object to be measured (strong magnet) from being close to or contact with the thimble part 400.

The front protection member 910 is constituted by a plurality of (in this description, three) front arm parts 920 arranged at predetermined angular intervals (in this description, at 120° intervals, for example).

The front arm parts 920 include a mounting part 921, an extending part 922, and a front arch part 923.

The mounting part 921 is mounted closer to the other end of a spindle holding part 720 (closer to the thimble part) to be fitted on the spindle holding part 720.

All of the (three) front arm parts 920 are connected by one mounting part 921.

The extending part 922 is continuous from the mounting part 921 and extends substantially parallel with the spindle holding part 720 to the middle of the spindle holding part 720.

The front arch part 923 is continuous from the tip of the extending part 922, is directed toward the thimble part 400 while being separated from the spindle holding part 720 in an arc, and has its tip around the thimble part 400.

The rear protection member (second protection member) 930 is disposed around the displacement detector 800 and prevents an object to be measured (strong magnet) from being close to or contact with the displacement detector.

The rear protection member 930 is constituted by a plurality of (in this description, three) rear arm parts 940 arranged at predetermined angular intervals (in this description, at 120° intervals, for example).

The rear arm parts 940 include an extension rod 941 mounted on a cap 821 of the displacement detector 800 and a rear arch part 942.

The rear arch part 942 is continuous from the other end (rear end) of the extension rod 941, is directed toward the displacement detector 800 while being separated from the extension rod 941 in an arc, and has its tip around the displacement detector 800.

The distance between the front arch part 923 and the thimble part 400 is a predetermined distance or more, for example, is preferably about 100 mm or more. Similarly, the distance between the rear arch part 942 and the displacement detector 800 is preferably about 100 mm.

This is because that the magnetic force between them is expected to be about 1 N or less when the distance between an object to be measured (strong magnet) and iron (the constituent material of the thimble part 400 and the displacement detector 800) is 100 mm or more as shown in FIG. 8.

The front protection member (first protection member) 910 and the rear protection member (second protection member) 930 are formed of a non-magnetic material.

The front protection member 910 and the rear protection member 930 have gaps for an operator to insert a hand, which does not interfere when the operator rotates the thimble part 400, sets the displacement detector 800, and reads a measurement value. Meanwhile, providing the front protection member 910 and the rear protection member 930 physically prevents an object to be measured from being close to the thimble part 400 or the displacement detector 800 and also catches an operator's attention not to insert an object to be measured (strong magnet) inside the protection members 910 and 930.

Note that, the present invention is not limited to the above exemplary embodiments and can be appropriately modified without deviating from the scope.

In the above exemplary embodiments, the materials of the main-body frame, the anvil, the guide bush, the spindle, the engaging piece member, and the thimble part (the inner sleeve and the outer sleeve) have been exemplified. In addition to those examples, a non-magnetic material may be selected from austenitic stainless steel, such as high manganese austenitic stainless steel or the like, pure aluminium, a non-magnetic aluminium alloy, a titanium alloy, ceramic, plastic (synthetic resin), such as carbon fiber reinforced plastic or the like, beryllium copper, a magnesium alloy, and brass.

As the encoder, a capacitive linear encoder has been exemplified.

In addition to this, a photoelectric encoder, an electromagnetic induction encoder, or a magnetic encoder is applicable.

In the encoder, glass substrates are preferably used for the main scale and the detection head.

However, only the chip of the arithmetic processing circuit may be covered in a magnetic shield material (for example, a ferromagnetic metal). If the chip is sufficiently small, the force (magnetic force) generated between the chip and an object to be measured (workpiece) that is a strong magnet is not very large.

In the second exemplary embodiment, the thimble part is mounted on the other end of the spindle holding part, and the displacement detector is provided on the other end of the thimble part.

By inverting the positions of the thimble part and the displacement detector, the displacement detector may be mounted on the other end of the spindle holding part, and the thimble part may be mounted on the other end of the displacement detector.

However, as in the second exemplary embodiment, the displacement detector incorporating the arithmetic processing unit, the communication function, and the like is preferably disposed as far as possible from the object-to-be-measured placement area.

100 Digital micrometer
200 Main-body frame
210 Anvil

220 Guide bush
230 Digital display unit
240 Operation switch
250 Mounting base
300 Spindle
310 Contactor
320 Taper
330 Engaging piece member
331 Taper hole
332 Engaging pin
400 Thimble part
410 Inner sleeve
411 Slit
412 Cap
420 Outer sleeve
421 Spiral groove
430 Cover member
500 Detecting unit
510 Encoder
511 Main scale
512 Detection head
520 Scale base
530 Head fixing part
531 Head holding plate
532 Protrusion
533 Pressing plate
534 Fixing plate
540 Flexible printed circuit board
600 Digital micrometer
700 Main-body frame
710 U-shaped frame part
720 Spindle holding part
800 Displacement detector
810 Casing
820 Stem
830 Contact point
840 joint
910 Front protection member
920 Front arm part
921 Mounting part
922 Extending part
923 Front arch part
930 Rear protection member
940 Rear arm part
941 Extension rod
942 Rear arch part

The invention claimed is:

1. A digital micrometer comprising:
a main-body frame including an U-shaped frame part including an anvil provided on an inner side of one end of the U-shaped frame, and a spindle holding part provided on the other end side of the U-shaped frame part and having a length in a direction away from the anvil;
a spindle held by the spindle holding part, provided to be movable forward and backward in an axial direction with respect to the anvil, and including a contactor on one end face;
a thimble part configured to convert rotational operation into linear motion of the spindle; and
a displacement detector configured to detect displacement of the spindle, wherein
the main-body frame and the spindle are formed of a non-magnetic material,
the thimble part and the displacement detector are disposed on the other end side of the spindle holding part, and
the length of the spindle holding part is a predetermined value or more.

2. The digital micrometer according to claim 1, wherein the length of the spindle holding part is a measuring range d or more,
where the measuring range d is a distance between the anvil and the contactor when the spindle is most separated from the anvil.

3. The digital micrometer according to claim 1, wherein the length of the spindle holding part is 200 mm or more.

4. The digital micrometer according to claim 1, wherein the thimble part includes:
an inner sleeve having a slit along an axial line and fixedly provided on the other end side of the main-body frame; and
an outer sleeve fitted on the inner sleeve to be rotatable in a peripheral direction and having a spiral groove on an inner peripheral surface,
the spindle includes an engaging pin,
the engaging pin is fixedly provided to the spindle and engaged with the spiral groove through the slit, and
the thimble part is provided on the other end of the spindle holding part.

5. The digital micrometer according to claim 4, wherein the displacement detector is provided on the other end of the thimble part.

6. The digital micrometer according to claim 5, wherein the displacement detector includes:
a contactor inserted inside the thimble part from the other end of the thimble part to move integrally with the other end of the spindle; and
an encoder including a scale configured to move integrally with the contactor, and a detection head configured to detect a relative position or a relative displacement amount with respect to the scale.

7. The digital micrometer according to claim 1, further comprising a first protection member formed of a non-magnetic material and disposed, around the thimble part, at a position separated from the thimble part by a predetermined distance.

8. The digital micrometer according to claim 1, further comprising a second protection member formed of a non-magnetic material and disposed, around the displacement detector, at a position separated from the displacement detector by a predetermined distance.

9. A digital micrometer comprising:
a main-body frame having a U shape and including an anvil provided on an inner side of one end of the U shape;
a spindle provided on the other end side of the main-body frame to be movable forward and backward in an axial direction with respect to the anvil and including a contactor on one end face;
a thimble part provided on the other end side of the main-body frame and configured to receive the other end of the spindle and to convert rotation operation into linear motion of the spindle; and
an encoder including a main scale configured to move integrally with the spindle, and a detection head disposed on the main-body frame and configured to detect a relative position or a relative displacement amount with respect to the main scale, wherein
the main-body frame and the spindle are formed of a non-magnetic material,
the thimble part includes:

an inner sleeve having a slit along an axial line and fixedly provided on the other end side of the main-body frame; and an outer sleeve fitted on the inner sleeve to be rotatable in a peripheral direction and having a spiral groove on an inner peripheral surface, the spindle includes an engaging pin, and the engaging pin is fixedly provided to the spindle and engaged with the spiral groove through the slit.

10. The digital micrometer according to claim 9, wherein the main-body frame is formed of austenitic stainless steel, pure aluminium, or a non-magnetic aluminium alloy, and the spindle is formed of austenitic stainless steel.

11. The digital micrometer according to claim 9, wherein the anvil and the contactor is formed of ceramic.

12. The digital micrometer according to claim 9, further comprising:

a guide bush provided, on the other end side of the main-body frame, closer to the anvil to bear the spindle, wherein the guide bush is formed of brass.

13. The digital micrometer according to claim 9, wherein the inner sleeve is formed of brass, pure aluminium, a non-magnetic aluminium alloy, or austenitic stainless steel.

14. The digital micrometer according to claim 9, wherein the encoder is a capacitive encoder, a photoelectric encoder, an electromagnetic induction encoder, or a magnetic encoder.

15. The digital micrometer according to claim 9, wherein the main-body frame is formed of austenitic stainless steel, the spindle is formed of austenitic stainless steel, the inner sleeve is formed of brass, and the encoder is a capacitive encoder.

* * * * *